US009766932B2

(12) United States Patent
Rangarajan et al.

(10) Patent No.: US 9,766,932 B2
(45) Date of Patent: Sep. 19, 2017

(54) ENERGY EFFICIENT JOB SCHEDULING

(71) Applicant: Microsoft Technology Licensing, LLC, Redmond, WA (US)

(72) Inventors: Nikhil Devanur Rangarajan, Seattle, WA (US); Debmalya Panigrahi, Bellevue, WA (US); Zhiyi Huang, Philadelphia, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 373 days.

(21) Appl. No.: 13/924,444

(22) Filed: Jun. 21, 2013

(65) Prior Publication Data

US 2014/0380321 A1 Dec. 25, 2014

(51) Int. Cl.
*G06F 9/46* (2006.01)
*G06F 9/48* (2006.01)

(52) U.S. Cl.
CPC .......... *G06F 9/4893* (2013.01); *Y02B 60/144* (2013.01)

(58) Field of Classification Search
CPC .............................. G06F 9/4893; G06F 9/4881
USPC ........................................................ 718/102
See application file for complete search history.

(56) References Cited

U.S. PATENT DOCUMENTS

| 7,149,910 B2 * | 12/2006 | Ishibashi | G06F 1/3203 713/300 |
| 2003/0208521 A1 * | 11/2003 | Brenner et al. | 709/103 |
| 2004/0184071 A1 * | 9/2004 | Garg et al. | 358/1.15 |
| 2012/0030683 A1 * | 2/2012 | Kurdi | G06F 9/5072 718/104 |
| 2013/0007753 A1 * | 1/2013 | Jain | 718/103 |
| 2014/0289733 A1 * | 9/2014 | Fritz | G06F 9/5066 718/104 |
| 2016/0188379 A1 * | 6/2016 | Rajappa | G06F 9/52 718/107 |

OTHER PUBLICATIONS

Chan et al. "Non-clairvoyant Speed Scaling for Weighed Flow Time", ESA'10 Proceedings of the 18th annual European conference on Algorithms: Part I , pp. 23-35.*
Azar et al. "Speed Scaling in the Non-clairvoyant Model", pp. 1-10. source: "http://research.microsoft.com/en-us/um/people/nikdev/pubs/spaa035-azarA.pdf."*
Sun et al. "Non-clairvoyant Speed Scaling for Batched Parallel Jobs on Multiprocessors", CF '09 Proceedings of the 6th ACM conference on Computing frontiers, pp. 99-108.*
Yuan et al. "Energy-Efficient Soft Real-Time CPU Scheduling for Mobile Multimedia Systems", Proceedings of the nineteenth ACM symposium on Operating systems principles, vol. 37 Issue 5, Dec. 2003, pp. 149-163.*

* cited by examiner

*Primary Examiner* — Meng An
*Assistant Examiner* — Willy W Huaracha

(57) ABSTRACT

The subject disclosure is directed towards scheduling jobs with a speed for running a processor(s) having variable speeds to save energy yet complete in time, in which the volume of the job is not known in advance, that is, in a non-clairvoyant setting. A non-clairvoyant algorithm uses an existing clairvoyant algorithm to determine the speed based upon information known from running one or more jobs, in full or in part. Also described is rounding jobs based upon their densities into rounding queues so that a hybrid of highest density first rules and FIFO rules may be used to obtain information used by the clairvoyant algorithm.

20 Claims, 9 Drawing Sheets

ENERGY EFFICIENT JOB SCHEDULING

BACKGROUND

Scheduling jobs to run on a single machine is a fundamental optimization problem, as is scheduling jobs to run on unrelated machines. Typically in such scheduling problems the jobs arrive "online" and over time. In order to complete a job, the job needs to be assigned a certain amount of processing, referred to as its processing volume.

Traditionally, devices given a set of jobs were run at their fastest possible speed, with the goal being to minimize the average flow time, where the flow time of a job (sometimes referred as the response time) is the duration of time between its release and completion. A standard objective is minimizing (a weighted) sum of flow times.

However, the amount of energy consumed by the processor or processors has become an important consideration, because of the high energy cost (e.g., of a datacenter), along with the wear on components, (and possibly the battery life on mobile devices). A machine can run at many different speeds, with the tradeoff that higher speeds process jobs faster but consume more energy. The power (the rate of energy consumed) by a processor is a given function of the speed, e.g., the cube of the speed. Thus, if there is time to complete a job at a slower speed, running at the fastest speed is not desirable.

Scheduling jobs in a way that saves energy yet complete the jobs in a desired time is a question of knowing which job to schedule next, (which may change as more important jobs arrive), and at what speed to run the machine. This is a complex problem that heretofore did not have a good solution or solutions.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards determining a speed and job using a clairvoyant algorithm (in which job volume data is known) to estimate a speed for a non-clairvoyant algorithm in which the job's volume is not known in advance. One or more aspects are directed towards scheduling a job based upon an energy and time objective, in which the job has an unknown volume. A starting speed for the job is computed based upon clairvoyant simulation information obtained from running at least part of at least one job. The job is run at the starting speed; weight-related information while running the job is obtained used to change the job running speed.

In one or more aspects, a job scheduler is coupled to a job executer, in which the job scheduler is configured to input jobs and schedule the jobs for execution by the job executer. The job scheduler includes a non-clairvoyant algorithm configured to determine a speed for a job having an unknown volume based upon a simulation performed by a clairvoyant algorithm. The job scheduler provides the speed and a job to the job executer for execution.

One or more aspects are directed towards selecting a job having an unknown volume based upon a highest rounded density first and a queuing order. An estimated speed for the job is estimated based upon running a clairvoyant algorithm simulation using any information available from running other jobs. The job is run at a speed that is based upon the estimated speed.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
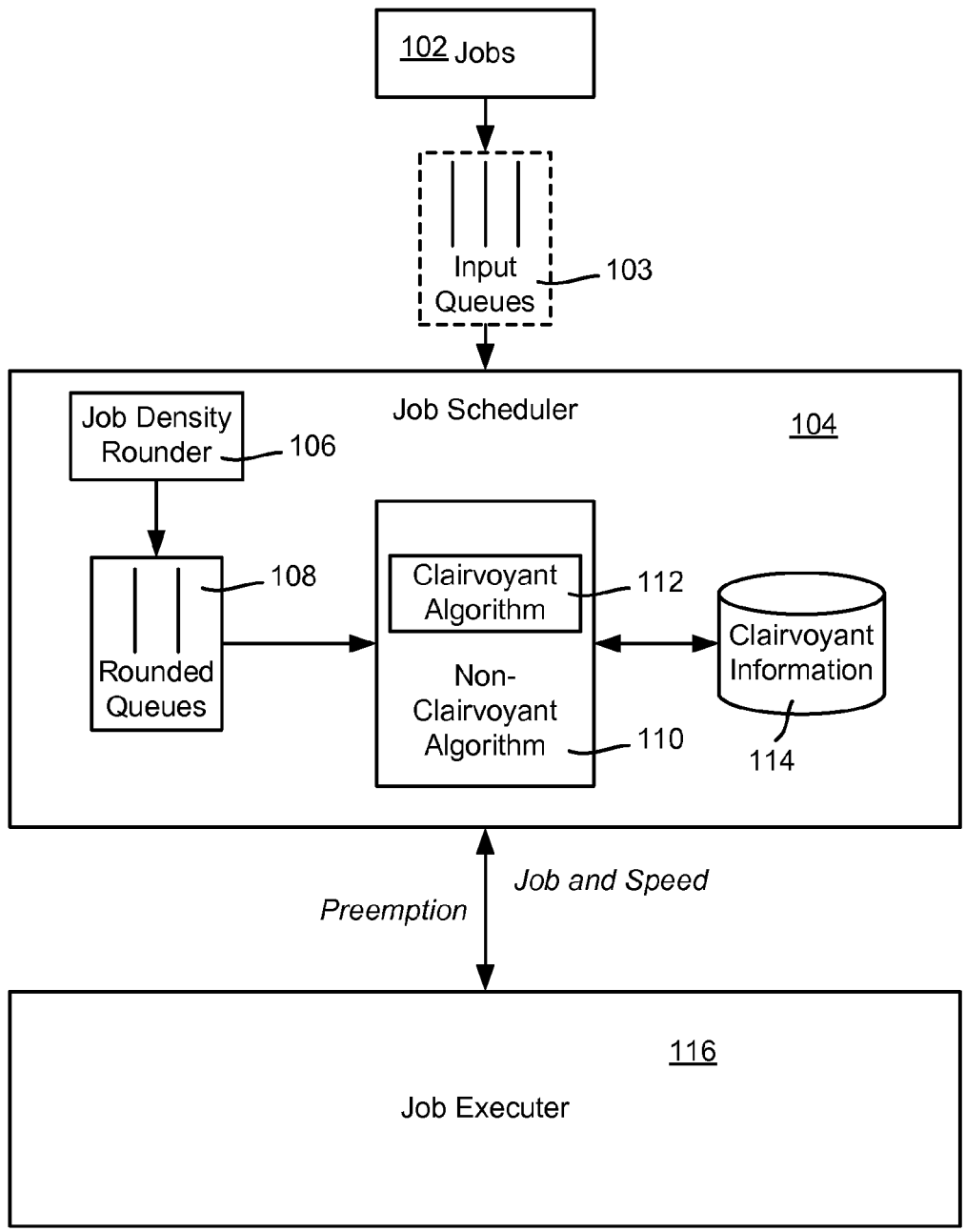
FIG. 1 is a block diagram representing example components for scheduling and running jobs based upon a non-clairvoyant algorithm, according to one or more example implementations.

Various aspects of the technology described herein are generally directed towards a job scheduling solution including an algorithm that decides which job to schedule next and at what speed to run the processor based on a history of jobs run so far. In a single machine version of the problem, each job has an importance, referred to as a density, which is known. However, the volume of a given job is not known beforehand. A non-clairvoyant algorithm may use a clairvoyant algorithm to determine a speed to run the job, which may change as the weight changes because of partial job execution. In the unrelated machines version of the problem, each job can have a different volume and a different weight for each machine.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing, energy saving and job scheduling in general.

Non-Clairvoyant Online Scheduling in a Single Machine

Most existing solutions to the problem of which job to run and at what speed are in a "clairvoyant" setting, where the algorithm knows in advance how much processing volume is needed for a job as soon as the job is released. A more difficult problem and often a more realistic one is where the processing volume is known only when the job is completed, i.e., in a "non-clairvoyant" setting.

In many instances, only the density (corresponding to the relative importance of a job) is available, not the volume or weight (density=weight/volume). For example, consider a server that gets requests for service in several queues where each queue has a different importance. The requests in each queue are ordered in FIFO order according to the arrival time, but the server may not know anything else other than that the requests need to be run as jobs.

Described herein is using the weights of partially or fully completed jobs to determine the speed for a job that is executing, including the weight of any part of the executing job itself that is known via partial completion. Indeed, with only densities known, setting the speed is difficult. In fact the problem of known density is non-trivial even for a single job. The optimal speed may vary greatly with the processing volume of the job; therefore, the algorithm has to continuously adapt as it learns more about the volume of the job. Furthermore, with multiple jobs, the order of job selection matters as well, because the choice of the job affects the information the algorithm obtains, which in turn affects the speed. FIFO, ("first-in first-out") is used in one implementation, however there is still a conflict between the FIFO rules and the HDF "highest density first" rules.

Described herein are constant-competitive algorithms for non-clairvoyant scheduling where the goal function is energy plus weighted fractional flow time, (where competitive refers to comparison against the schedule that would have been run had the volume knowledge gained in hindsight after the execution of the jobs been known beforehand). When a job is released, the system knows its density (but not its volume); the technology described herein considers any power function of the form $P(s)=s^\alpha$ and gives:

- an O(1)-competitive algorithm for the general problem with non-uniform densities and arbitrary release times. The constant depends exponentially on $\alpha$.
- a $2+1/(\alpha-1)$ competitive algorithm for the uniform density case, i.e., the jobs have identical density but are released over time.
- an O(1)-competitive algorithm for the batch-processing case, where jobs are released at the same time but have arbitrary densities. Here the constant is universal for $\alpha>=2$.

In a clairvoyant setting, an optimal offline solution to the problem has an intrinsic dependence on the job volumes. For large volumes, the optimal speed starts high and gradually decreases over time as jobs are processed.

In the non-clairvoyant setting, not knowing the volumes is therefore problematic. If the machine is run too slow then the flow-time may be too large if the total job volume is large. However, running the jobs too fast wastes energy when the volume is small. Described herein is using clairvoyant-based estimation to determine a speed in a non-clairvoyant setting, and then adapting the clairvoyant-based estimation and thus the speed as more information becomes available.

FIG. 1 shows a generalized block diagram in which incoming jobs 102 are received at a job scheduler component 104. As set forth herein, the density of each job is known, however the volume is not. The densities may be uniform or arbitrary, and jobs may arrive at any time. As represented in FIG. 1, one way to associate a job with a density is to have jobs queued in a plurality of input queues 103, each queue corresponding to a density/priority, for example. The input queues 103 represented by a dashed block in FIG. 1, as this is only one way to do so, and because there may not be an associated density in the case of uniform density jobs.

As described herein, in one implementation the incoming jobs 102 may be rounded (quantized) by their densities into a multiplicative grid, i.e., powers of some constant, that is, queued into buckets. This is shown in FIG. 1 as a job density rounder 106 placing jobs into one of a set of rounded queues 108 based upon each job's density. As an example, a rounded queue may exist for densities ranging from one to two (non-inclusive), another for densities from two (inclusive) to four (non-inclusive), another for densities from four (inclusive) to eight, and so on.

As described herein, the jobs are removed from the rounded queues 108 in FIFO order according to a highest "bucket" density first scheme. There is thus a hybrid approach between pure FIFO and pure HDF rules. A general reason for this is that running jobs in FIFO order provides information that makes the non-clairvoyant algorithm operate more efficiently, yet still allows higher density jobs to generally run before lower density jobs, that is, before those in "lower" buckets.

Once a job is selected, a non-clairvoyant algorithm 110 uses a clairvoyant algorithm 112 to determine a speed for running that job, based upon past results (clairvoyant information) 114 corresponding to earlier job execution. The speed and the job are sent to a job executor 116 to run the selected job. As will be understood, the speed is changed as more information is obtained, and the job that is being run may be preempted by a higher density job (e.g., in a higher density bucket).

When the system selects a job to execute, the system wants to know the volumes of the jobs released earlier to simulate the clairvoyant algorithm on the selected jobs. For the uniform density case, this does not conflict with the HDF order of the clairvoyant algorithm because all the densities are the same. In this case, the system gets a strong relation between the clairvoyant and the non-clairvoyant algorithms; there is a measure-preserving map from the timeline of one to the other so that under this map, the speeds of the two algorithms are the same. This implies that the energy consumed is the same for the two algorithms; bounding the flow time requires more work. The system then continuously modifies the measure-preserving map between the two algorithms to maintain the required property.

Figure 2:
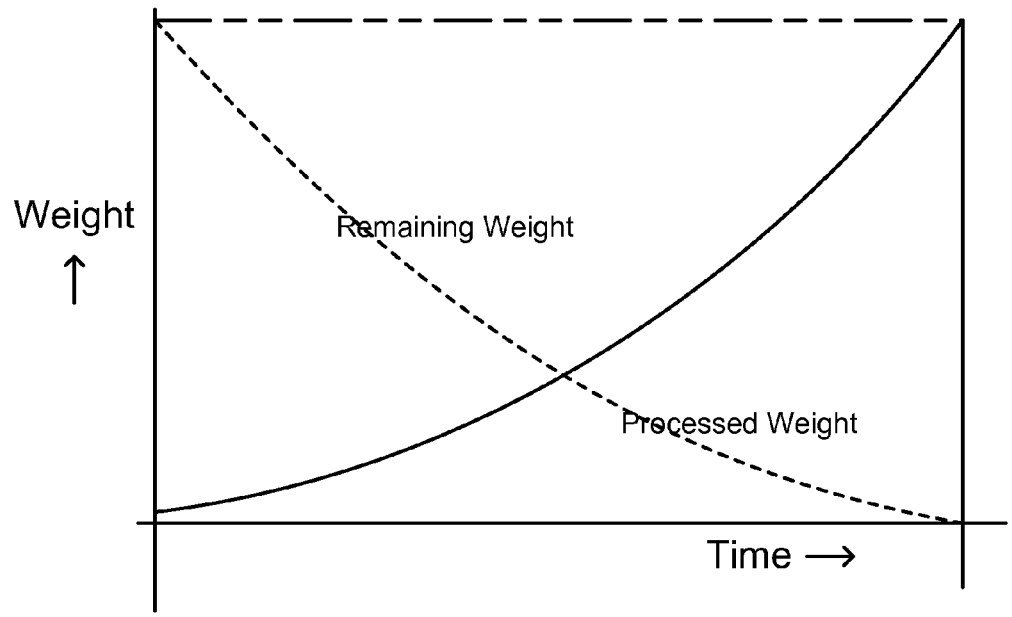
FIG. 2 is a representation of how weight increases as execution of a job progresses over time via the non-clairvoyant algorithm, in a substantially mirror image of a clairvoyant algorithm, according to one or more example implementations.

FIG. 2 shows a general way in which the clairvoyant algorithm and non-clairvoyant algorithm are related to where the non-clairvoyant algorithm. FIG. 2 represents a single job being run showing how the remaining weight (above the solid-line curve) and processed weight (below the solid-line curve) change as processing occurs over time. The dashed line represents running in the non-clairvoyant setting, e.g., a simulation starting at a computed speed based upon the known volume from other jobs. Note that the non-clairvoyant solid line and area is (substantially) the mirror image of the clairvoyant.

As can be seen, the area represented by the remaining weight (e.g., the integral) corresponds to the flow time, while the processed weight area represents the power. The non-clairvoyant starts based upon the clairvoyant, e.g., essentially at zero processor speed because there is no volume yet. Note that in actuality, some non-zero speed is used to get some volume computed that can be further used as information. As the weight increases, more information is known, whereby the speed is increased as needed to complete the job.

Figure 3:
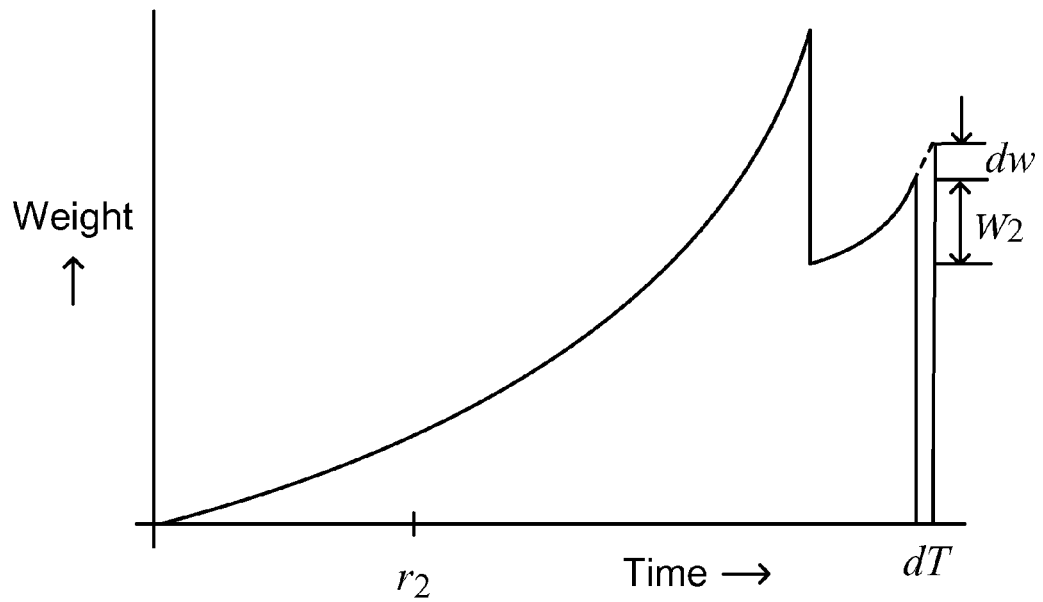
FIG. 3 is representation of how weight increases over time as execution of two jobs occur based upon the non-clairvoyant algorithm, according to one or more example implementations.

FIG. 3 shows a change in the non-clairvoyant algorithm upon processing an extra dw weight of a job 2 which takes an extra time of dT. Job 2 is released at $r_2$ and has weight $w_2$ currently. Job 1 is released at time 0 and has weight $w_1$, all of which has been processed. Note that the speed of Job 2 does not start at or near zero, because information that may be used to estimate speed is known from job 1.

Figure 4:
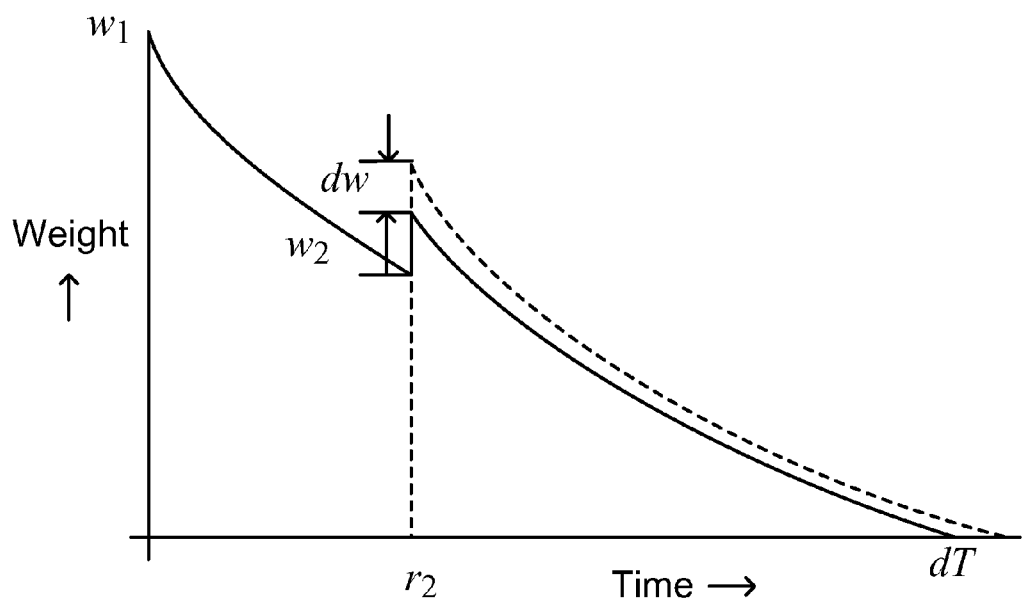
FIG. 4 is representation of how weight decreases over time as execution of two jobs occur based upon the clairvoyant algorithm, according to one or more example implementations.

FIG. 4 shows a change in the run of the clairvoyant algorithm due to an extra dw weight of job 2. Here the speed of the algorithm changes all the way from time $r_2$ to the end. The extra time taken dT is nevertheless the same as in the case of the non-clairvoyant case.

Figure 5:
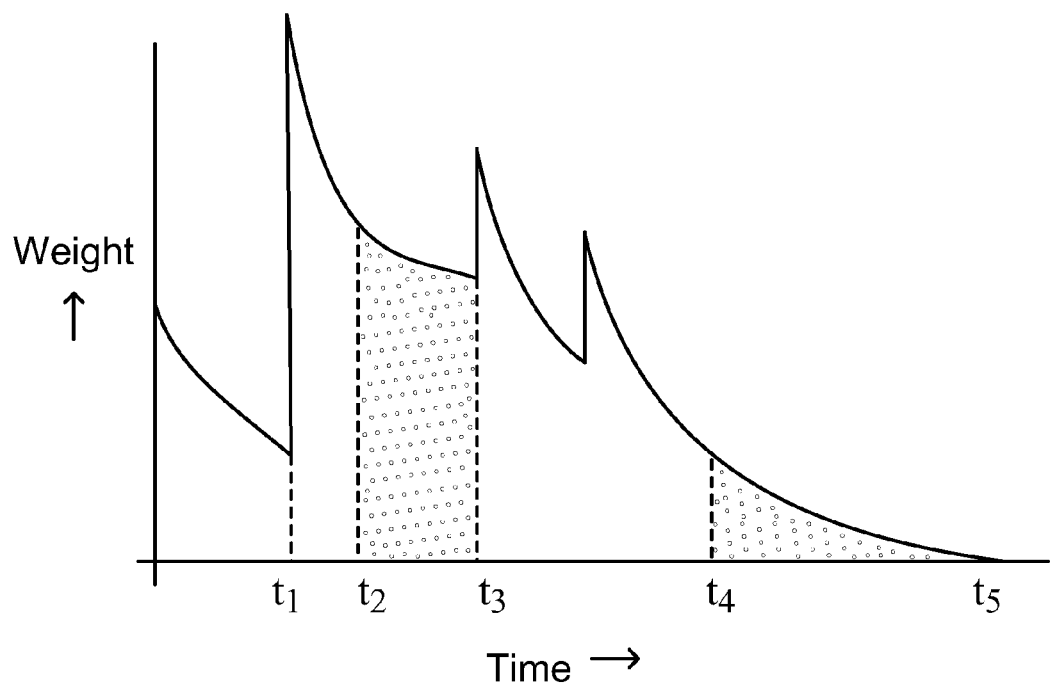
FIG. 5 is a representation of job preemption, according to one or more example implementations.

FIG. 5 shows preemption intervals in algorithm c for the current instance. Job j* is released at time $t_1$, i.e. $r_j^*=t_1$ and is processed in the dotted intervals. There are two preemption intervals $[t_1, t_2]$ and $[t_3, t_4]$, i.e. $\hat{R}_1=t_1$ and $\hat{R}_2=t_3$. Therefore, i*=2. The last preemption interval completes after the current time t.

A more complicated approach is needed for the batch-processing case. Here the system assumes that the jobs are released at the same time, therefore any order is FIFO and the algorithm schedules them in HDF order without any conflict. Once again, a local argument suffices, that as time goes on, the change in the energy consumed by the clairvoyant algorithm due to the change in the intermediate instance can be related to the change in the energy and flow time of the non-clairvoyant algorithm. Because the total energy and flow time of the clairvoyant algorithm are the same, this gives the required competitive ratio.

Most of the difficulty in the general case comes from the conflict between the FIFO and the HDF orders. While the system wants to process the jobs released earlier first in order to learn their volumes, the jobs with the higher densities incur a bigger cost so they have to be scheduled first. As set forth above, one implementation adopts a hybrid approach via the job density rounder 106 and rounded queues 108; the system rounds the densities to a multiplicative grid, i.e., powers of some constant. Jobs with equal densities (after the rounding, if rounding is used) are processed in FIFO order, while jobs of higher densities preempt ones with lower densities. The non-clairvoyant algorithm is competitive against the clairvoyant algorithm.

However, other difficulties arise. First, even if only two jobs of unequal density are released over time, if the system sets the speed of the non-clairvoyant algorithm so that its completion time matches with that of the clairvoyant algorithm, then the flow time of the non-clairvoyant algorithm cannot be locally bounded against that of the clairvoyant algorithm. In other words, there are situations where, on transforming the instance by adding infinitesimal weight to the job being processed currently by the non-clairvoyant algorithm, the flow-time of the clairvoyant algorithm increases by lower order terms compared to the increase in the non-clairvoyant algorithm.

Further, consider that a job j was preempted by job j' in the non-clairvoyant algorithm. The local competitive analysis fails exactly when the machine resumes processing j after having completed the processing of j'. Note that if the non-clairvoyant algorithm matches the completion time of the clairvoyant algorithm, then this resumption happens at the same time in both algorithms.

To overcome this difficulty, in one implementation, the system deliberately speeds up the non-clairvoyant algorithm (e.g., by a constant factor) so that its completion time is earlier than that of the clairvoyant algorithm, thereby eliminating the scenario where both algorithms resume processing a job at the same time. In fact, the local competitive analysis can be restored if on transforming an instance, the increase in the remaining weight for the clairvoyant algorithm at the current time is at least a constant fraction of the weight added in the transformation. However, this property does not hold in general. Instead there is a weaker property along the same lines, and an amortized analysis is used to add a global component to the local competitive analysis. In particular, the system shows that while in certain situations, the increase in flow time of the clairvoyant algorithm is negligible compared to that of the non-clairvoyant algorithm, there are other situations where the increase is larger than what the system needs for local competitiveness. This suggests the use of a potential function that stores the additional flow-time of the clairvoyant algorithm for later use in the competitive analysis.

To summarize, the online problem of scheduling a single machine to minimize the flow-time plus energy is as follows. There is a single machine that can run at any non-negative speed, and there are jobs that need certain amounts of processing power. Running the machine at a higher speed processes jobs faster but consumes higher energy, as given by a power function $P: R_+ \to R_+$ that is monotonically non-decreasing and convex; $P(0)=0$. The general problem is to process the jobs in a way that minimizes the sum of the total energy consumed and the total weighted flow-time of the jobs (which measures how long the jobs wait). Note that the power function is predefined and is not considered part of an instance of the problem.

Input: the input is a set of jobs J. For each job j ∈J, its release time r[j], volume V[j] and density ρ[j]. Let the weight of job j be $W[j]=\rho[j] \cdot V[j]$.

Output: the output, for each time t ∈[0, ∞], is the job to be scheduled at time t, denoted by j(t) and the speed of the machine s(t). For brevity, s is imply written when the dependence on t is clear from the context.

Constraints: a job can only be scheduled after its release time. For each job j the total computation time allocated needs to be equal to its volume:

$$\int_{t \in [r[j], \infty); j(t)=j} s(t)dt = V[j].$$

Objectives: the total energy consumed is simply the integral of the power function over time.

$$E = \int_{t=0}^{\infty} P(s(t))dt.$$

The fractional flow-time (for a given job j) is:

$$F[j] = \rho[j] \cdot \int_{t \in [r[j], \infty); j(t)=j}(t-r[j])s(t)dt.$$

whereby $$F[j] = \rho[j] \cdot \int_{t=r[j]}^{\infty} \overline{V}(t)[j]dt,$$

where $\overline{V}(t)[j]$ is the volume of job j remaining at time t.

$$\overline{V}(t)[j] = V[j] - \int_{t' \in [r[j], t]; j(t')=j} s(t')dt'.$$

The problem is to minimize the sum of the energy and the sum of the flow-times of all the jobs, which is:

$$G = E + \sum_j F[j].$$

The difference from the online clairvoyant version of the same problem is that the details of job j are given at time r[j]. The algorithm makes its decisions at any time without knowing which jobs will be released in the future. In the online non-clairvoyant version of the problem, upon the release of job j at time r[j], only the density is given; the volume is not given. At any future point of time, only knows whether $\bar{V}(t)[j]>0$ or not is known. If a job j is such that $\bar{V}(t)[j]>0$, the job is active, otherwise it is called inactive (e.g., completed or not released yet).

Turning to an algorithm for the online clairvoyant version of the problem, referred to as Algorithm C (which is 2-competitive), the job to be scheduled is determined using the "highest density first" (HDF) rule: schedule the active job with the highest density. The speed at time t is set based on the total remaining weight of the active jobs at time t, which is denoted by $$\overline{W}(t) := \sum_j \rho[j] \cdot \overline{V}(t)[j].$$

The speed at time t is such that
$$P(s(t)) = \overline{W}(t).$$

For Algorithm C, the total energy is equal to the total flow-time. This is because the total flow time is $$\sum_j F[j] = \int_{t=0}^{\infty} \sum_j \rho[j] \cdot \overline{V}(t)[j] dt \int_{t=0}^{\infty} \overline{W}(t) dt$$

With respect to the uniform density case, i.e., $\rho[j]=1$ for all j, described herein is an algorithm for the online non-clairvoyant version of the problem, referred to as Algorithm NC. It is assumed without loss of generality that the release times are all distinct. Because of uniform density, the job to be scheduled is determined according to the FIFO rule, namely schedule active job j, if one exists, with the smallest r[j]. The speed is set by considering a run of algorithm C on the same instance. Note that by the time Algorithm NC schedules a job j, the system knows the volumes/weights of the jobs that are released earlier than r[j]. Thus the system can simulate the algorithm C up to time r[j]. Let $$\overline{W}^{(c)}(r[j]^-) = \lim_{t \to r[j]^-} \overline{W}^{(c)}(t)$$

be the remaining weight of the active jobs in algorithm C at time r[j] (not including the weight of job j). As the algorithm NC is processing jobs, at time t let $\check{W}(t)[j]$ be the weight of job j completed up to that time. At time t the algorithm NC sets a speed s such that
$$P(s) = \overline{W}^{(c)}(r[j]^-) + \check{W}(t)[j].$$

The system considers power functions of the form $P(s)=s^\alpha$ for some $\alpha>1$. A competitive ratio may be obtained for Algorithm NC by showing that it is actually almost as good as Algorithm C, despite being in the non-clairvoyant setting. The energy consumed in the two algorithms is the same and that the flow-times are within a factor of $$1 - \frac{1}{\alpha}.$$

The competitive ratio of Algorithm NC follows because Algorithm C is 2-competitive and the total flow time is equal to the total energy for Algorithm C.

Turning to a non-clairvoyant algorithm for jobs of non-uniform density, the system needs to specify, for every time t, the job selected for processing at time t, and the speed at which the selected job is processed. As set forth above, in the non-clairvoyant version, the algorithm only has the densities of the jobs that have been released until time t, the volume/weight of the jobs that have been completed until time t, the set of active jobs, and a lower bound on the volume/weight of every active job given by the volume/weight of the job processed by the non-clairvoyant algorithm until time t. As in the case of uniform densities, the non-clairvoyant algorithm is closely related to the clairvoyant algorithm (algorithm C) for the current instance I(t). Recall that algorithm C uses the HDF rule to determine the processing order among jobs of different densities that are waiting at any given time (and that the total flow-time and the energy are both the same for Algorithm C). If there are multiple jobs of the highest density, then the algorithm is agnostic to which of these jobs is chosen, but for the purpose of this analysis, it is convenient to assume that algorithm C uses the FIFO rule, i.e. it selects the job with the highest density that was released the earliest.

The Non-clairvoyant Algorithm (Algorithm NC) may round the densities down to powers of some constant β. Similar to algorithm C, algorithm NC also processes the job with the highest density among the active jobs at any given time, and uses the FIFO rule to decide the processing order of jobs of the same density. (Note that, in effect, jobs in the same density bracket are processed in FIFO rather than HDF order because their densities are rounded to the same value.) The speed of algorithm NC at time t is η times the speed of algorithm C for the instance I(t) (the current instance), i.e., $s^{(NC)}(t) = \eta \cdot s_t^{(C)}(t)$, where η is a constant that may be tuned. (Again, the rounding of densities affects the speed of algorithm NC via algorithm C since I(t) is now defined to be the rounded instance at time t.) The current instance will eventually evolve to the real problem instance, unless algorithm NC always runs at zero speed. Indeed, as set forth above, because initially all jobs in the current instance have zero weight, the speed given by the above definition will be zero. Thus, the speed of algorithm NC is set to be ε more than that given by the above definition, for some arbitrarily small but fixed ε.

Figure 6:
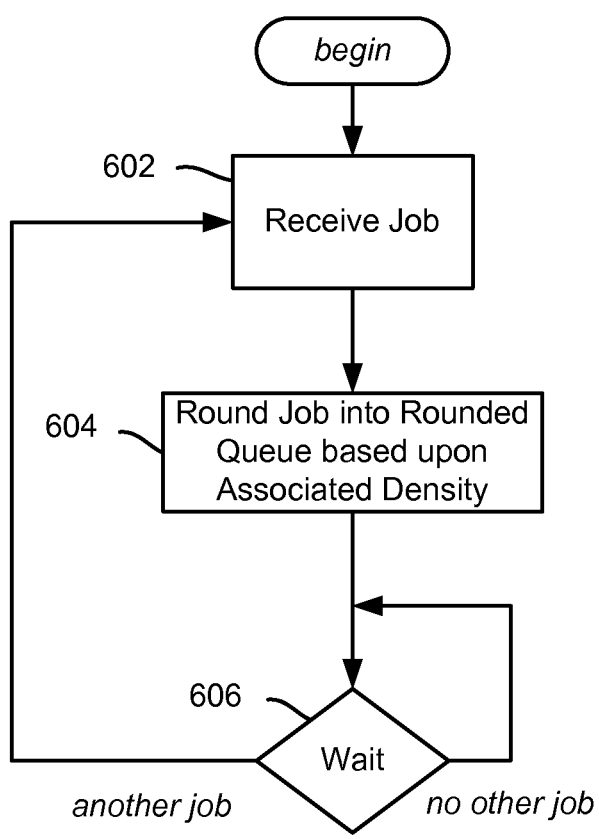
FIG. 6 is a flow diagram representing example steps that may be taken to round a job into a rounding queue based upon its density, according to one or more example implementations.

FIG. 6 shows the concept of rounding jobs into one of the rounded buckets; (note that rounding, which may be performed to get theoretical bounds even in a worst-case scenario, is optional, and the technology described herein may be used without any rounding). Step 602 receives the job. The job may have an associated density by some direct metadata, or may have an associated density by being placed into an input queue 103 (FIG. 1) corresponding to the density that the server processes.

Step 604 uses the associated density to round the job into one of the rounded queues, (e.g., quantize the job into a corresponding bucket). Note that step 604 may dequeue a job from a priority queue representative of the associated density and queue the job into the rounded queue.

Step 606 represents waiting for the next job.

Figure 7:
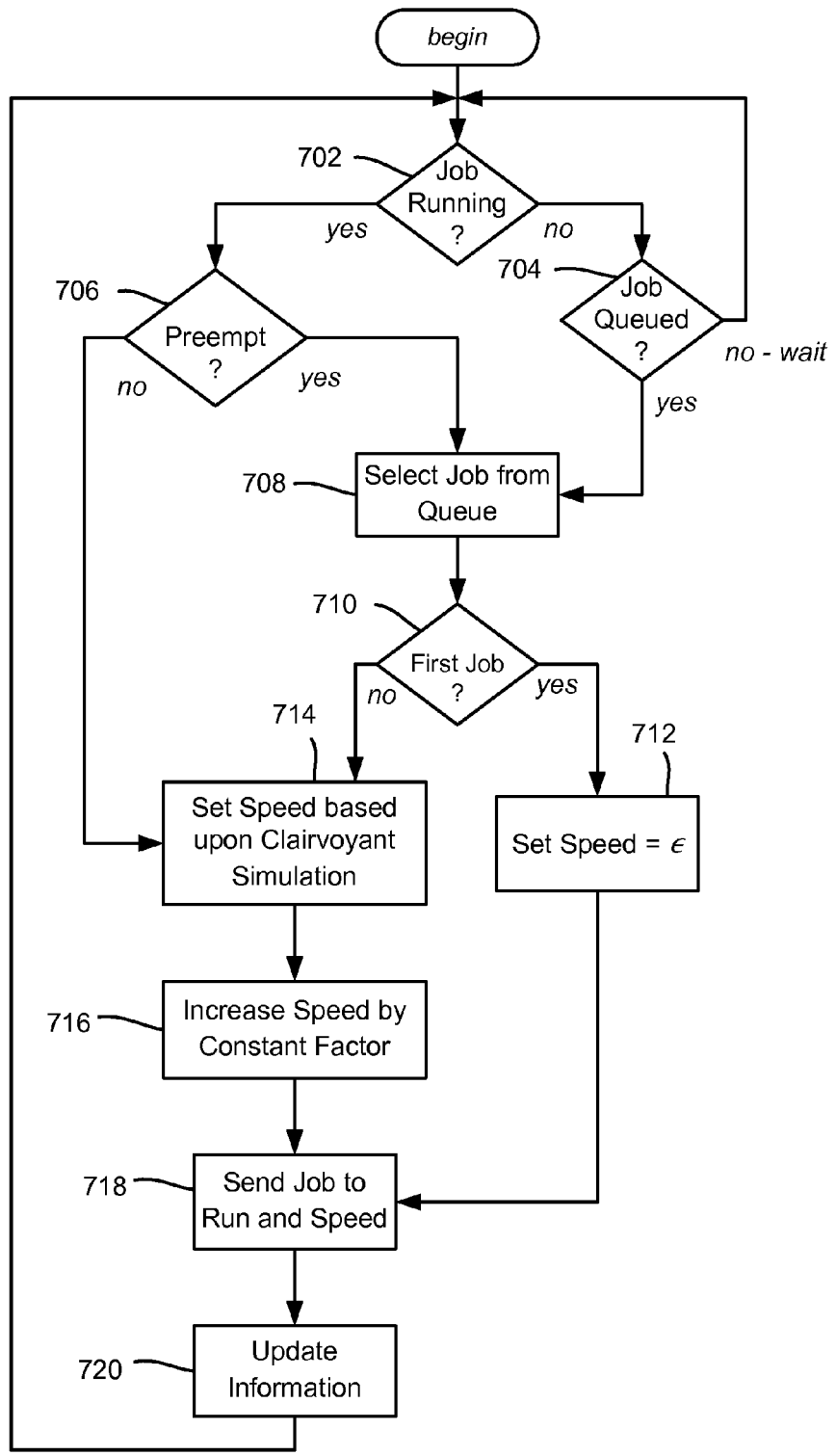
FIG. 7 is a flow diagram representing example steps that may be taken to schedule jobs, according to one example implementation.

FIG. 7 shows example steps related to scheduling jobs, including changing a job's speed and/or preempting a job. Step 702 evaluates whether a job is running. If not, and no job is queued (step 704), the process waits. If a job is queued, a job is selected at step 708 from the highest priority (e.g., rounded) queue based upon FIFO order.

If a job is running, step 706 represents determining whether any job is queued that can preempt the running job. If so, a job is selected at step 708 from the highest priority (e.g., rounded) queue based upon FIFO order. If not, step 706 branches to step 712 to adjust the speed of the currently running job based upon the change in weight that has occurred since the speed was last computed.

As part of determining the speed for a dequeued job, step 710 represents evaluating whether the job is the first one, e.g., there is no weight yet that may be used as information for computing the speed. If so, at step 712 the speed is set to (zero plus) ϵ as described above. Otherwise step 714 sets the speed based upon the clairvoyant simulation.

Step 716 represents increasing the speed by a constant factor to compensate for some of the problems described above. Step 718 sends the job and speed to the job executer, (or at least any changed speed for a running job that is not preempted). Any preemption and speed changes may be handled by the job executer.

Step 720 updates the information that is used by the non-clairvoyant algorithm to simulate the clairvoyant setting. Thus, a job that is completed in whole or preempted may be handled as in other systems, however its results are used for future simulations. Moreover, a job that continues running has its weight factored into future simulations.

Online Scheduling of Jobs on Unrelated Machines

Another aspect is directed towards the online scheduling of jobs on unrelated machines with dynamic speed scaling to minimize the sum of energy and weighted flow time. Note that as with the above-described single machine approach, preemption/resumption is allowed, but migration of a job from one machine to another is not.

Described herein is one example algorithm with an almost optimal competitive ratio for arbitrary power functions; (known prior results do not handle arbitrary power functions for unrelated machines). For power functions of the form $f(s)=s^\alpha$ for some constant $\alpha>1$, an improved competitive ratio is obtained, along with a matching lower bound.

The algorithm has to schedule the jobs on one or more machines so as to complete them as soon as possible. A standard objective is (a weighted) sum of flow times; each job can have a different volume and a different weight for each machine.

In one implementation, the objective has two components, energy and flow-time. Recall that $f$ is the power function, which gives the power consumption as a function of the speed. Power is the rate at which energy is consumed therefore energy consumed is the integral of power over time. The energy consumed by machine i is therefore:

$$E_i = \int_0^\infty f(s_{it})dt.$$

The fractional flow-time is an aggregated measure of the waiting time of a job. Suppose job j is scheduled on machine i. Let $\hat{v}_j(t)$ be the remaining volume of job j at time t, i.e., $$\hat{v}_j(t) = v_{ij} - \int_{t' \in [r_j,t]: j_i(t')=j} s_i(t')dt'.$$

The fractional flow-time of job j is then defined to be:

$$F_j := \frac{1}{v_{ij}} \int_{r_j}^\infty \hat{v}_j dt.$$

The objective is to minimize the total energy consumed by the machines and the sum of the flow-times of all the jobs, weighted by their densities:

$$\sum_i \left( E_i + \sum_{j: j \to i} w_{ij} F_j \right).$$

In the online version of the problem the details of job j are given only at time $r_j$. The algorithm has to make decisions at time t without knowing anything about the jobs released in the future.

The algorithms exemplified herein are based on a convex programming relaxation of the problem and its dual, which are as follows. The dual convex program is obtained using Fenchel duality. (In particular $f^*$ is the Fenchel conjugate of $f$.)

$$(P_{frac})\ \text{Minimize}\ \sum_{i,j} \rho_{ij} \int_{r_j}^\infty (t-r_j)s_{ijt}\,dt + \tag{1}$$

$$\sum_i \int_0^\infty f(s_{it})dt + \sum_{i,j} \int_{r_j}^\infty \frac{s_{ijt}}{w_{ij}} \left( \int_0^{w_{ij}} (f^*)^{-1}(w)dw \right)dt\ \text{s.t.}$$

$$\forall i, t:\ s_{it} = \sum_{j: r_j \le t} s_{ijt}$$

$$\forall j:\ \sum_i \int_{r_j}^\infty \frac{s_{ijt}}{v_{ij}}dt \ge 1 \tag{2}$$

$$(D_{frac})\ \text{Maximize}\ \sum_j \alpha_j - \sum_i \int_0^\infty f^*(\beta_{it})dt\ \text{s.t.}$$

$$\forall i, j, t \ge r_j:\ \frac{\alpha_j}{v_{ij}} \le \rho_{ij}(t-r_j) + \beta_{it} + \frac{1}{w_{ij}} \int_0^{w_{ij}} (f^*)^{-1}(w)dw$$

The variables $s_{it}$ denote the speed at which job j is scheduled on machine i at time t. $s_{it} = \sum_j s_{ijt}$ is the total speed of machine i at time t. The first summation in the objective function corresponds to the fractional flow-time: $s_{it}dt$ units of job j are processed between t and t+dt, which waited for a duration of $t-r_j$ resulting in $$(t-r_j)\frac{s_{ijt}}{v_{ij}}$$

dt amount of fractional flow-time. The second summation is the total energy consumed. The third summation is used because the convex program allows a job to be split among many machines and have different parts run in parallel. This sometimes allows the convex program to have a much lower objective than the optimal solution to the problem.

We will explain how the third term fixes this problem a little later. Constraint (1) defines $s_{it}$. For each job j, constraint (2) enforces that the scheduling needs to complete job j. Hence, the primal program is a valid relaxation of the scheduling problem and the first two terms in the objective capture the fractional flow time and energy cost of the given schedule.

The first two terms in the primal objective are not enough to give a good lower bound for the cost of the optimal schedule, hence the third term. Note that the system does not enforce that all of job j must be processed on the same machine, therefore both job migrations and parallel processing of the same job on multiple machines are allowed. Consider an instance with only one job released at time 0 and a large number of machines. The optimal solution to the convex program schedules the job simultaneously on all the machines and the total cost with respect to the first two terms will tend to zero as the number of machines tends to infinity. The optimal algorithm has to schedule the job on a single machine and hence pays a fixed non-zero cost. Without the third term, the convex program fails to provide a good lower bound on the cost of the optimal solution.

Consider a modified instance where there are multiple copies of each machine (as many as the number of jobs); the cost of the optimal solution to this instance is only lower. In this modified instance, without loss of generality, no two jobs are ever scheduled on the same machine. It can be shown that if job j is scheduled on a copy of machine i by itself, then the optimal cost (energy+flow-time) due to job j is $$\frac{v_{ij}}{w_{ij}} \int_0^{w_{ij}} (f^*)^{-1}(w) dw.$$

Now, still allowing a job to be split among different machines, an $$\int_{r_j}^{\infty} \frac{s_{ijt}}{v_{ij}} dt$$

fraction of job j is scheduled on machine i. Thus $$\sum_i \int_{r_j}^{\infty} \frac{s_{ijt}}{v_{ij}} \left( \int_0^{w_{ij}} (f^*)^{-1}(w) dw \right) dt$$

is a lower bound on the cost of scheduling job j. This implies that the optimum of the convex program with an additional factor of two is a lower bound on OPT, the optimum offline solution to the problem.

Turning to optimal scheduling for single job, a simpler convex program and its dual is obtained for the problem of scheduling a single job on a single machine. The third term in the objective is dropped because that deals with non-integral assignment of jobs to machines. Because there is only one job, it may be assumed that that $r_j=0$.

$$\text{Minimize } \int_0^{\infty} \rho_{ij} t s_{ijt} dt + \int_0^{\infty} f(s_{it}) dt \quad (3)$$

s.t. $\forall t \; s_{it} = s_{ijt}$, $$\int_0^{\infty} \frac{s_{ijt}}{v_j} dt \geq 1.$$

$$\text{Maximize } \alpha_j - \int_0^{\infty} f^*(\beta_{it}) dt$$

s.t. $\forall t: \frac{\alpha_j}{v_{ij}} \leq \rho_{ij} \cdot t + \beta_{it}.$

The conjugate function $f^*$ is defined as $$f^*(\beta) := \sup_s \{\beta s - f(s)\}.$$

The conjugate function is also convex and monotonically non-decreasing. If the function is strictly convex, then so is the conjugate function. One property of the conjugate function is the notion of a complementary pair; $\beta$ and s are said to be a complementary pair if any one of the following conditions hold. (It can be shown that if one of them holds, then so do the others.)

$f'(s)=\beta.$     1.

$f^{*\prime}(\beta)=s.$     2.

$f(s)=f^*(\beta)=s\beta.$     3.

The optimal solutions to these programs are characterized by the (generalized) complementary slackness or KKT conditions. These are:

1. $\forall t, s_{ijt} > 0 \Rightarrow \alpha_j = v_{ij}(\rho_{ij} t + \beta_{it}).$ 2. $\alpha_j > 0 \Rightarrow \int_0^{\infty} \frac{s_{ijt}}{v_j} dt = 1.$ 3. $\beta_{it}$ and $s_{it}$ are a complementary pair for all $t$.

The first condition implies that for the entire duration that the machine is running (with non-zero speed), the quantity $\rho_{ijt}+\beta_{it}$ remains the same, since it must always equal $\alpha_j$. In other words, $\beta_{it}$ linearly decreases with time, at the rate of $\rho_{ij}$.

$$\frac{d\beta_{it}}{dt} = -\rho_{ij}. \quad (4)$$

The main result is that the optimum solution has a closed form expression where $s_{it}$ and $\beta_{it}$ are set as a function of the remaining weight of the job at time t, which is denoted by $\hat{w}_{it}$. (More generally, $\hat{w}_{it}$ denotes the total remaining weight of all the jobs on machine i.) Also the remaining volume at time t is denoted $\hat{v}_{it}$.

Turning to optimal scheduling for a single machine, that is, where there are multiple jobs to be scheduled on a single machine, with corresponding convex programs. Again assume that $r_j=0$ for all jobs j.

$$\text{Minimize } \sum_j \int_{r_j}^{\infty} \rho_{ij} t s_{ijt} dt + \int_0^{\infty} f(s_{it}) dt \quad (5)$$

s.t. $\forall t, s_{it} = \sum_j s_{ijt},$ $\forall j, \; \int_0^{\infty} \frac{s_{ijt}}{v_{ij}} dt \geq 1.$ $$\text{Maximize } \sum_j \alpha_j - \int_0^{\infty} f^*(\beta_{it}) dt$$

s.t. $\forall i, j, \; \frac{\alpha_j}{v_{ij}} \leq \rho_{ij} \cdot t + \beta_{it}.$ The complementary slackness conditions for these pair of programs are basically as before. To begin with, $s_{ijt} > 0 \Rightarrow \frac{\alpha_j}{v_{ij}} = \rho_{ij} t + \beta_{it}.$ As before, this implies that $\beta_{it}$ decreases at rate $\rho_{ij}$ whenever job j is scheduled, but now there is a choice of jobs to schedule. The above complementary slackness condition implies that job j needs to be scheduled when the term $\rho_{ij}t+\beta_{it}$ attains its minimum. The first part, $\rho_{ij}t$, always increases at rate $\rho_{ij}$, while the second part, $\beta_{it}$ decreases at rate $\rho_{ij(t)}$ where j(t) is the job scheduled at time t. So if $\rho_{ij}<\rho_{ij(t)}$ then $\rho_{ij}t+\beta_{it}$ is decreasing and vice-versa, if $\rho_{ij}>\rho_{ij(t)}$ then $\rho_{ij}t+\beta_{it}$ is increasing. This implies that the "highest density first" (HDF) rule is optimal, i.e., schedule the jobs in the decreasing order of the density. For any job j, $\rho_{ij}t+\beta_{it}$ first decreases when higher density jobs are scheduled, then remains constant as job j is scheduled and then increases as lower density jobs are scheduled. Given the choice of jobs scheduled, the choice of speed is very similar to the single-job case.

Described herein is a primal-dual algorithm which referred to as conservative-greedy. The basic idea of algorithm is that given the choice of job assignments to machines, the algorithm schedules the jobs as if no other jobs will be released in the future. That is, it schedules the jobs as per the optimal schedule for the current set of jobs, as described above. The choice of job assignments to machines is done via a natural primal-dual method, the one dictated by the complementary slackness conditions; (a more aggressive algorithm is described below; if a job is released in the future, then it is better to run faster than what the current optimal solution suggests. To the contrary, if there is no future job, then running faster is sub-optimal. The aggressive algorithm balances these tradeoffs.

With respect to the conservative-greedy algorithm, at any point, given the jobs already released and their assignment to machines, the algorithm picks the optimal scheduling on each machine, assuming no future jobs are released. This also gives dual solutions, in particular the variables $\beta_{it}$ for all i and t in the future. When a new job j is released, its assignment to a machine is naturally driven by the following dual constraints and the corresponding complementary slackness conditions. For all i, t $$\frac{\alpha_j}{v_{ij}} \le \rho_{ij}(t-r_j) + \beta_{it} + \frac{1}{w_{ij}}\int_0^{w_{ij}} (f^*)^{-1}(w)dw.$$

For a given machine i, the right hand side (RHS) is minimized (over all t) at $t^*_i$ where $t^*_i$ is the first time job j is scheduled on i given the HDF rule. That remains true because the third term above is independent of t. The algorithm minimizes all i as well, by assigning job j to the machine i that minimizes the RHS of the inequality above with $t=t^*_i$. It sets the dual $\alpha_j$ so that the corresponding constraint is tight, then updates the schedule and $\beta_{it}$'s for machine i. Note that as more jobs are added, the $\beta_{it}$'s can only increase, thus preserving dual feasibility. The conservative greedy online scheduling algorithm for minimizing fractional flow time plus energy with arbitrary power functions is shown below:

---
Fractional conservative greedy algorithm
---
Speed Scaling: Choose speed $s_{it}$ such that $f^*(f'(s_{it}))$ equals the fractional remaining weight on machine i. Set duals $\beta_{it} = (f'(s_{it}))$, also for future times
based on the planned schedule currently.
Job Selection: Schedule the job with the highest density (HDF).
Job Assignment: Assign job j to machine i that minimizes ---continued
Fractional conservative greedy algorithm
---

$$\rho_{ij}(t_i^* - r_j) + \beta_{it_i^*} + \frac{1}{w_{ij}}\int_0^{w_{ij}} (f^*)^{-1}(w)dw$$

where $t_i^*$ is the first time job j is scheduled on i given the HDF rule. Set $\alpha_j$ so that the corresponding constraint is tight. Update the $\beta_{it}$'s for machine i.

---

Such a conservative approach already achieves a meaningful competitive ratio for arbitrary power functions and a near optimal competitive ratio for polynomial power functions. An alternate algorithm with essentially the same analysis is the following: assign job j to machine i for which the increase in the total cost is the minimum. The dual $\alpha_j$ needs to be set as done currently, so there may be a disconnect between which machine the job is assigned to and which machine dictates the dual solution.

In the conservative greedy algorithm, the speed is scaled to the conservative extreme as the speed is optimal assuming no future jobs will arrive. However, in an online instance there may be future jobs and some of these future jobs will be effectively delayed by the current job. Therefore, a good online algorithm needs to take this into account when choosing the speed. Described herein are algorithms with different aggressiveness in terms of speed scaling.

Given any parameter $C \ge 1$, one C-aggressive greedy algorithm for minimizing weighted fractional flow time plus energy (with arbitrary power functions) is:

---
Fractional C-aggressive greedy algorithm
---
Speed Scaling: Choose speed $s_{it}$ such that $f^*\left(f'\left(\frac{s_{it}}{C}\right)\right)$ equals the total remaining weight on machine i. Set duals $\beta_{it} = \frac{1}{C}(f^*)^{-1}(\hat{w}_{it})$ such that $f^*(C\beta_{it})$ equals the total remaining weight on machine i, also for future times based on the planned schedule currently.
Job Selection: Schedule the job with the highest density (HDF).
Job Assignment: Assign job j to machine i that minimizes $$\rho_{ij}(t_i^* - r_j) + \beta_{it_i^*} + \frac{1}{w_{ij}}\int_0^{w_{ij}} (f^*)^{-1}(w)dw$$

where $t_i^*$ is the first time job j is scheduled on i given the HDF rule. Set $\alpha_j$ so that the corresponding constraint is tight. Update the $\beta_{it}$'s for machine i.

---

Turning to the problem of online scheduling for minimizing weighted (integral) flow-time plus energy, the problem for weighted integral flow time has the same input, output, and constraints as the fractional flow time version. The only difference is the objective. Formally defining the weighted integral flow time of an instance given a schedule: Let $A_t$ denote the set of jobs such that have been released before or at time t but have not been completed according to the schedule until time t, i.e., $$r_j \le t \text{ and } \int_{t \in [r_j, \infty]: j_s(t)=j} s_{it} dt < v_{ij}.$$

The weighted flow time is defined as:

$$\int_0^\infty \sum_i \sum_{j \in A_t: j \to i} w_{ij} dt.$$

Thus, the main difference is that when a job is partially completed, the entire weight of the job will contribute to the weighted integral flow time, while only the incomplete fraction will contribute to the weighted fractional flow time.

With respect to convex programming relaxation and the dual, similar to the fractional, the primal-dual analysis may be used via following convex program for the problem of minimizing integral flow time plus energy and consider its dual program:

$$(P_{int}) \text{ Minimize } \sum_i \sum_j \int_{r_j}^{\infty} \rho_{ij}(t - r_j) s_{ijt} dt +$$

$$\int_0^{\infty} f(s_{it}) dt + \sum_i \sum_j \int_{r_j}^{\infty} (f^*)^{-1}(w_{ij}) s_{ijt} dt$$

$$\forall i, t: \sum_{j: r_j \leq t} s_{ijt} = s_{it}$$

$$\forall j: \sum_i \int_{r_j}^{\infty} \frac{s_{ijt}}{v_{ij}} \geq 1$$

$$(D_{int}) \text{ Maximize } \sum_j \alpha_j - \sum_i \int_0^{\infty} f^*(\beta_{it}) dt$$

$$\forall i, j, t \geq r_j: \frac{\alpha_j}{v_{ij}} \leq \rho_{ij}(t - r_j) + \beta_{it} + (f^*)^{-1}(w_{ij})$$

Here the same notation is used as in the fractional case and thus additional details are omitted for brevity. The only change is the third term in the primal program (and the corresponding part in the dual). This is because conditioned on being allocated to machine i, the optimal cost for job j in a single-job instance with respect to integral flow time plus energy is $v_{ij}(f^*)^{-1}(w_{ij})$. Hence, the share of the optimal single-job cost for the $$\frac{s_{ijt}}{v_{ij}} dt$$

fraction of job j is processed on machine i from t to t+dt is $(f^*)^{-1}(w_{ij}) s_{ijt} dt$.

Similar to the fractional case, a conservative greedy algorithm is considered, which use the optimal speed scaling assuming there are no future jobs, along with a more general family of C-aggressive greedy algorithms. The main difference comparing to the fractional case is the job selection rule on a single machine is no longer HDF. Instead, the algorithms will combine the job assignment rule job selection rule by maintaining a processing queue for each machine. The machines will process the jobs in their queues in order. When a new job arrives, the algorithm will insert the new job to a position in one of the processing queue according to the dual variables. A formal description of the conservative greedy online scheduling algorithm for minimizing weighted integral flow time plus energy with arbitrary power functions is:

---
Integral conservative greedy algorithm
---
Speed Scaling: Choose speed $s_{it}$ such that $f^*(f'(s_{it}))$ equals the integral remaining weight on machine i. Set duals $\beta_{it} = (f'(s_{it}))$ such that $f^*(\beta_{it})$, equals the integral remaining weight on machine i, also for future times based on the planned schedule currently.
Job Selection and Job Assignment: Upon arrival of a new job j, assign it to ---
-continued Integral conservative greedy algorithm
---
a machine i and insert it into the processing queue of i such that the system minimizes $$\rho_{ij}(t_i^* - r_j) + \beta_{it_i^*} + \frac{1}{w_{ij}} \int_0^{w_{ij}} (f^*)^{-1}(w) dw$$

where $t_i^*$ is the completion time of the predecessor of job j in the queue.
Set $\alpha_j$ so that the corresponding constraint is tight. Update the $\beta_{it}$'s for machine i.

---

A C-aggressive greedy online scheduling algorithm for minimizing weighted integral flow time plus energy with arbitrary power function is:

---
Integral C-aggressive greedy algorithm
---
Speed Scaling: Choose speed $s_{it}$ such that $f^*\left(f'\left(\frac{s_{it}}{C}\right)\right)$ equals the integral remaining weight on machine i. Set duals $\beta_{it} = \frac{1}{C} f'\left(\frac{s_{it}}{C}\right)$ such that $f^*(C\beta_{it})$ equals the integral remaining weight on machine i, also for future times based on the planned schedule currently.
Job Selection and Job Assignment: Upon arrival of a new job j, assign it to a machine i and insert it into the processing queue of i to minimize:

$$\rho_{ij}(t_i^* - r_j) + \beta_{it_i^*} + \frac{1}{w_{ij}} \int_0^{w_{ij}} (f^*)^{-1}(w) dw$$

where $t_i^*$ is the completion time of the predecessor of job j in the queue.
Set $\alpha_j$ so that the corresponding constraint is tight. Update the $\beta_{it}$'s for machine i.

---

Figure 8:
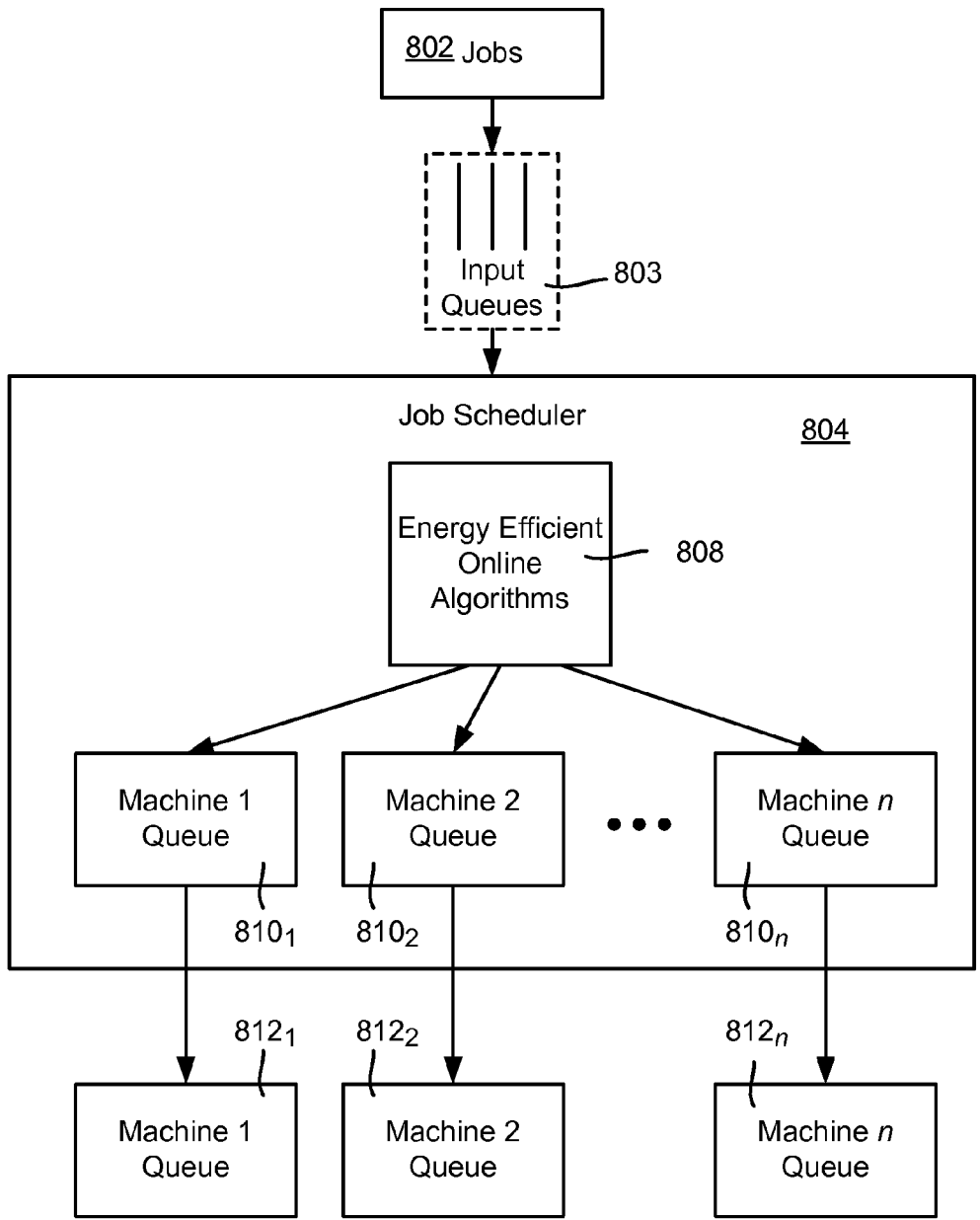
FIG. 8 is a block diagram representing example components for scheduling and running jobs on multiple machines according to various algorithms, according to one or more example implementations.

FIG. 8 shows a generalized block diagram in which incoming jobs 802 are received at a job scheduler component 804. As represented in FIG. 3, one way to associate a job with a density is to have jobs queued in a plurality of input queues 803, each queue corresponding to a density/priority, for example. The input queues 803 represented by a dashed block in FIG. 8, as this is only one way to do so, and because there may not be an associated density in the case of uniform density jobs.

As described herein, as the jobs are dequeued from the input, one of the above online algorithms 808 (e.g., fractional conservative greedy algorithm, fractional C-aggressive greedy algorithm, integral conservative greedy algorithm and/or integral C-aggressive greedy algorithm) queues the jobs for each machine in a per machine queue $810_1$-$810_n$, where n is greater or equal to one. The machines $812_1$-$812_n$ then execute the jobs.

Example Operating Environment

Figure 9:
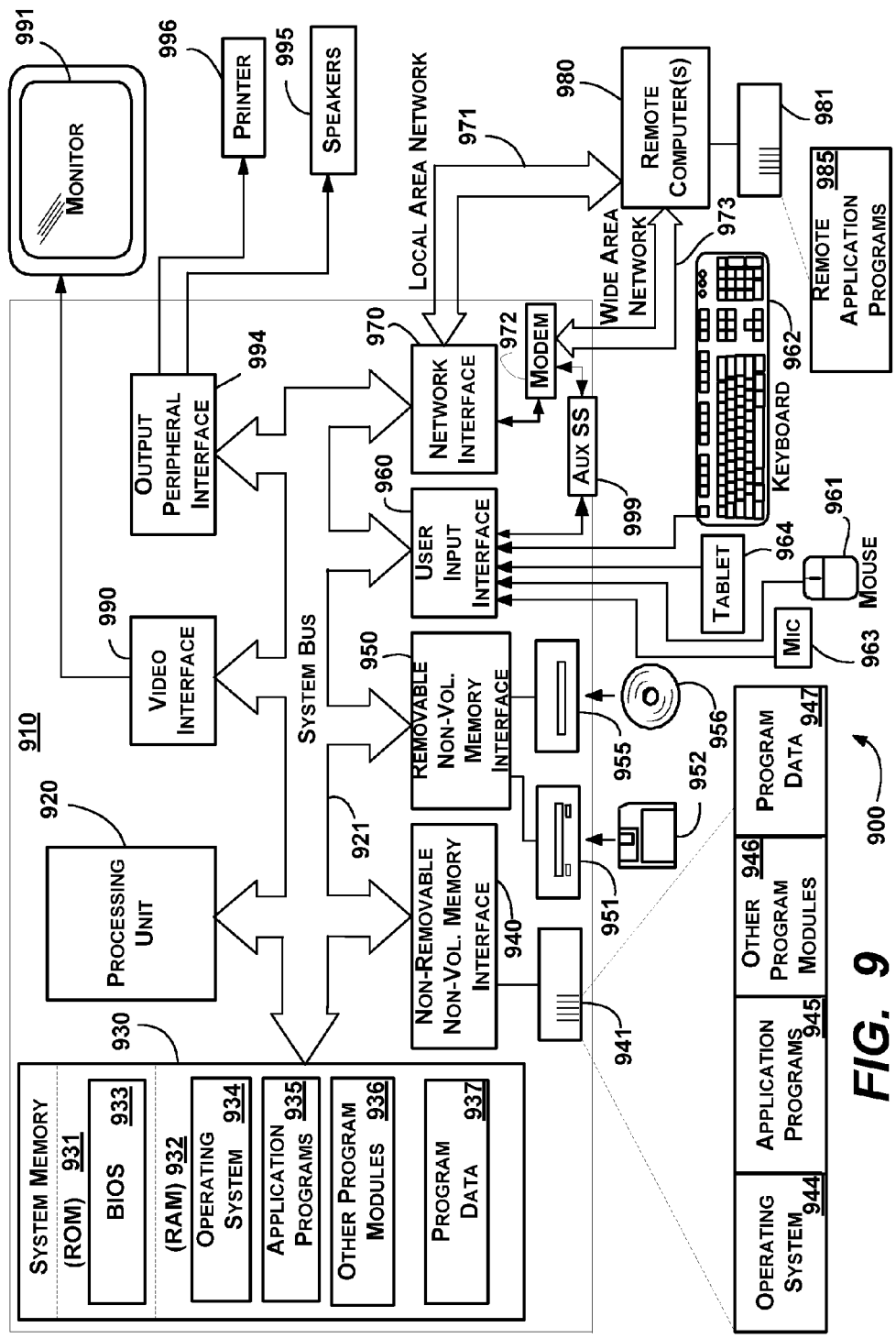
FIG. 9 is a block diagram representing an example non-limiting computing system and operating environment in which one or more aspects of various embodiments described herein can be implemented.

FIG. 9 illustrates an example of a suitable computing and networking environment 900 into which the examples and implementations of any of FIGS. 1-8 as well as any alternatives may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the example operating environment 900.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 9, an example system for implementing various aspects of the invention may include a general purpose computing device in the form of a computer 910. Components of the computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer-readable media. Computer-readable media can be any available media that can be accessed by the computer 910 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 910. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936 (e.g., a hypervisor) and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media, described above and illustrated in FIG. 9, provide storage of computer-readable instructions, data structures, program modules and other data for the computer 910. In FIG. 9, for example, hard disk drive 941 is illustrated as storing operating system 944, application programs 945, other program modules 946 (e.g., hypervisor code) and program data 947. Note that these components can either be the same as or different from operating system 934, application programs 935, other program modules 936, and program data 937. Operating system 944, application programs 945, other program modules 946, and program data 947 are given different numbers herein to illustrate that, at a minimum, they are different copies. A user may enter commands and information into the computer 910 through input devices such as a tablet, or electronic digitizer, 964, a microphone 963, a keyboard 962 and pointing device 961, commonly referred to as mouse, trackball or touch pad. Other input devices not shown in FIG. 9 may include a joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. The monitor 991 may also be integrated with a touch-screen panel or the like. Note that the monitor and/or touch screen panel can be physically coupled to a housing in which the computing device 910 is incorporated, such as in a tablet-type personal computer. In addition, computers such as the computing device 910 may also include other peripheral output devices such as speakers 995 and printer 996, which may be connected through an output peripheral interface 994 or the like.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include one or more local area networks (LAN) 971 and one or more wide area networks (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960 or other appropriate mechanism. A wireless networking component 974 such as comprising an interface and antenna may be coupled through a suitable device such as an access point or peer computer to a WAN or LAN. In a networked environment, program modules depicted relative to the computer 910, or portions thereof, may be stored in the remote memory storage device. By way of example, and not limitation, FIG. 9 illustrates remote application programs 985 as residing on memory device 981. It may be appreciated that the network connections shown are examples and other means of establishing a communications link between the computers may be used.

An auxiliary subsystem 999 (e.g., for auxiliary display of content) may be connected via the user interface 960 to allow data such as program content, system status and event notifications to be provided to the user, even if the main portions of the computer system are in a low power state. The auxiliary subsystem 999 may be connected to the modem 972 and/or network interface 970 to allow communication between these systems while the main processing unit 920 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for scheduling a job based on energy and time objective objectives, the job having an associated density and an unknown volume, the method comprising:
   rounding the job;
   placing the rounded job into a rounding queue of a plurality of rounding queues based upon the associated density of the job;
   selecting the job from the rounding queue based upon first-in, first-out (FIFO) order;
   computing, using a clairvoyant algorithm, an estimated speed for the selected job based upon a weight of the selected job determined from a partial completion of the selected job and clairvoyant simulation information obtained from running at least part of at least one job or an entire job;
   initiate execution of the selected job at the computed estimated speed;
   upon a partial completion of the selected job, obtaining weight-related information of the selecting job;
   using the weight-related information to determine a modification of the weight of the job; and
   adjusting the computed estimated speed of the job during execution of the job based on the determined weight modification.

2. The method of claim 1 further comprising, configuring the plurality of rounding queues as a multiplicative grid.

3. The method of claim 1 wherein the density is associated with the job via an input queue of a plurality of input queues.

4. The method of claim 3, wherein rounding the job into one of the plurality of rounding queues based upon the associated density comprises moving the job from an input queue to a selected rounding queue.

5. The method of claim 1 further comprising, preempting the job with a job in a higher density rounding queue.

6. The method of claim 1 wherein adjusting the computed estimated speed of the job comprises combining the clairvoyant simulation information with the weight-related information obtained while running the job to perform a clairvoyant simulation.

7. The method of claim 1 wherein computing the estimated speed for the job comprises performing a clairvoyant simulation.

8. The method of claim 7 wherein computing the estimated speed for the job further comprises increasing the estimated computed speed by a factor.

9. The method of claim 1 further comprising, preempting the job with a job having a higher density.

10. The method of claim 1, wherein the job arrives with a plurality of jobs as one or more of the following: a batch, a plurality of jobs having uniform densities, and jobs having non-uniform densities.

11. A system comprising, a processor programmed to:
   rounding a job;
   placing the rounded job into a rounding queue of a plurality of rounding queues based upon the associated density of the job;
   selecting the job from the rounding queue based upon first-in, first-out (FIFO) order;
   use a clairvoyant algorithm to compute an estimated speed for the job having an associated density and an unknown volume based upon a weight of the job and a simulation performed by the clairvoyant algorithm and from a partial completion of the job;
   initiate an execution of the job at the computed estimated speed;
   determine a modification of the weight of the job after a partial completion of the job; and
   adjust the computed estimated speed of the job during execution of the job based on the determined weight modification.

12. The system of claim 11 wherein the clairvoyant algorithm uses weight information from previous results when available, or if no weight information is available, determines a non-zero first speed value.

13. The system of claim 11 wherein the processor increases the estimated speed by a constant factor.

14. The system of claim 11 wherein the processor preempts a running job with a job from a higher density rounding queue relative to the rounding queue corresponding to the running job.

15. The system of claim 11 wherein the rounding queues are arranged as a multiplicative grid.

16. The system of claim 11 wherein at least some of the jobs arrive as one or more of the following: a batch, a plurality of jobs having uniform densities, and jobs having non-uniform densities.

17. One or more machine-readable memory devices having executable instructions, which upon execution perform operations, comprising:
   rounding a job;
   placing the rounded job into a rounding queue of a plurality of rounding queues based upon the associated density of the job;
   selecting the job from the rounding queue based upon first-in, first-out (FIFO) order, the job having an associated density and an unknown volume;
   estimating, using a clairvoyant algorithm, an execution speed for the job based upon a weight of the job and running a clairvoyant algorithm simulation using historical information available from previous executions of other jobs and from a partial completion of the job; and
   running the job at the execution speed based upon the estimated execution speed;
   determining a modification of the weight of the job after a partial completion of the job; and
   while the job is being executed:
      acquiring information regarding a volume of the job; and
      based on the acquired information regarding the volume of the job and on the determined weight modification, adjusting the estimated execution speed.

18. The one or more machine-readable memory devices of claim 17 having further executable instructions comprising:
   preempting the job with a second job; and
   using weight-related data obtained from partially running the job in estimating a speed for the second job.

19. The one or more machine-readable memory devices of claim 17 wherein the plurality of rounding queues are arranged as a multiplicative grid.

20. The one or more machine-readable memory devices of claim 17 wherein the density is associated with the job via an input queue of a plurality of input queues.

* * * * *